(12) United States Patent
Mayer (10) Patent No.: US 8,091,271 B2
(45) Date of Patent: Jan. 10, 2012

(54) BLOOD-SIMULATING FISHING LURE

(76) Inventor: James D. Mayer, Lincoln, NE (US)

( * ) Notice: Subject to any disclaimer, the term of this patent is extended or adjusted under 35 U.S.C. 154(b) by 283 days.

(21) Appl. No.: 12/289,320

(22) Filed: Oct. 24, 2008

(65) Prior Publication Data

US 2009/0133314 A1    May 28, 2009

Related U.S. Application Data

(60) Provisional application No. 60/996,582, filed on Nov. 26, 2007, provisional application No. 61/129,281, filed on Jun. 16, 2008.

(51) Int. Cl.
*A01K 85/00* (2006.01)
(52) U.S. Cl. ............... 43/42.32; 43/42.09; 43/42.24; 43/42.26; 43/42.28; 43/42.36
(58) Field of Classification Search ............ 43/42.09, 43/42.32, 42.39, 42.24, 42.26, 42.28, 42.36, 43/44.87, 44.9, 44.91
See application file for complete search history.

(56) References Cited

U.S. PATENT DOCUMENTS

| | | | | |
|---|---|---|---|---|
| 271,424 A * | 1/1883 | Comstock | | 43/42.36 |
| 1,067,178 A * | 7/1913 | Lambert | | 43/42.34 |
| 1,325,651 A * | 12/1919 | Pajeau | | 43/42.26 |
| 1,569,993 A * | 1/1926 | MacLeod | | 43/42.26 |
| 1,599,763 A * | 9/1926 | Head | | 43/42.09 |
| 1,723,557 A * | 8/1929 | Ono | | 43/42.36 |
| 1,754,567 A * | 4/1930 | Newell | | 43/42.28 |
| 1,822,785 A * | 9/1931 | Petrie | | 43/42.36 |
| 1,854,027 A * | 4/1932 | Gruenhagen | | 43/42.36 |
| 2,006,604 A * | 7/1935 | Post | | 43/42.36 |
| 2,102,739 A * | 12/1937 | Peters | | 43/42.32 |
| 2,123,150 A * | 7/1938 | Larson et al. | | 43/42.28 |
| 2,261,549 A * | 11/1941 | Hayes | | 43/42.36 |
| 2,333,425 A * | 11/1943 | Jackson, Sr. | | 43/42.28 |
| 2,465,064 A * | 3/1949 | Colosimo | | 43/42.09 |
| 2,481,789 A * | 9/1949 | Smith | | 43/42.15 |
| 2,583,942 A * | 1/1952 | Harvey | | 43/42.26 |
| 2,586,186 A * | 2/1952 | Swanberg | | 43/42.39 |
| 2,603,025 A * | 7/1952 | Brown | | 43/42.28 |
| 2,612,717 A * | 10/1952 | Kuehnel | | 43/42.28 |
| 2,621,437 A * | 12/1952 | Pedranti | | 43/42.36 |
| 2,636,304 A * | 4/1953 | Swenson | | 43/42.36 |
| 2,694,844 A * | 11/1954 | Grumbach | | 43/42.24 |

(Continued)

FOREIGN PATENT DOCUMENTS

DE    19513689 A1 *    2/1996

(Continued)

OTHER PUBLICATIONS

Hagen's 2006/2007 Fishing Components Catalog. (p. 127).

*Primary Examiner* — Darren W Ark
(74) *Attorney, Agent, or Firm* — Sherrill Law Offices, PLLC (57) ABSTRACT

The blood-simulating fishing lure is a fishing lure having a chain of lightweight spherical elements or ball chain threaded through or attached to an artificial lure body, such as a float or plug, to simulate a bleeding or wounded baitfish as it moves through the water. The spherical elements are preferably colored red and made from aluminum or other lightweight material. The chain is preferably attached to the lure so that a portion of the chain extends on both sides of the float or plug.

11 Claims, 11 Drawing Sheets

U.S. PATENT DOCUMENTS

| | | | | |
|---|---|---|---|---|
| 2,698,494 | A * | 1/1955 | Larsen | 43/42.36 |
| 2,703,945 | A * | 3/1955 | Johnson | 43/42.36 |
| 2,722,766 | A * | 11/1955 | Accetta | 43/42.36 |
| 2,765,572 | A * | 10/1956 | Woolfe | 43/42.26 |
| 2,778,143 | A * | 1/1957 | Bratz, Sr. | 43/42.05 |
| 2,792,662 | A * | 5/1957 | Norton | 43/42.36 |
| 2,814,086 | A * | 11/1957 | Bahr | 43/44.83 |
| 2,847,792 | A * | 8/1958 | Kuhlmann | 43/44.9 |
| 2,865,130 | A * | 12/1958 | Accetta | 43/42.24 |
| 2,896,360 | A * | 7/1959 | Lucas | 43/44.2 |
| 2,912,784 | A * | 11/1959 | Carlin | 43/42.24 |
| 2,983,065 | A * | 5/1961 | Ferguson et al. | 43/42.06 |
| 2,983,067 | A * | 5/1961 | Saywell, Jr. | 43/44.9 |
| 3,017,716 | A * | 1/1962 | Hawks | 43/42.36 |
| 3,040,466 | A * | 6/1962 | Jablonski | 43/42.09 |
| 3,043,044 | A * | 7/1962 | Metzler | 43/44.87 |
| 3,078,611 | A * | 2/1963 | Nishioka | 43/42.36 |
| 3,079,723 | A * | 3/1963 | Roes | 43/42.26 |
| 3,110,979 | A * | 11/1963 | Woodley | 43/42.28 |
| 3,141,255 | A * | 7/1964 | Randall | 43/42.39 |
| 3,186,123 | A * | 6/1965 | Freeman | 43/42.39 |
| 3,245,171 | A * | 4/1966 | Henry | 43/42.24 |
| 3,271,893 | A * | 9/1966 | Bowers | 43/44.9 |
| 3,343,296 | A * | 9/1967 | Davis | 43/42.28 |
| 3,405,474 | A * | 10/1968 | Lewis | 43/42.24 |
| 3,426,467 | A * | 2/1969 | Bryant | 43/42.28 |
| 3,427,744 | A * | 2/1969 | Roberts | 43/42.39 |
| 3,429,066 | A * | 2/1969 | McClellan | 43/42.24 |
| 3,440,757 | A * | 4/1969 | McClellan | 43/42.36 |
| 3,537,207 | A * | 11/1970 | McClellan et al. | 43/42.24 |
| 3,568,351 | A * | 3/1971 | Perrin | 43/42.06 |
| 3,589,052 | A * | 6/1971 | King | 43/44.88 |
| 3,654,724 | A * | 4/1972 | Charron | 43/42.28 |
| 3,685,192 | A * | 8/1972 | Stibbard | 43/42.24 |
| 3,708,903 | A * | 1/1973 | Bercz et al. | 43/42.09 |
| 3,762,092 | A * | 10/1973 | Bercz et al. | 43/42.35 |
| 3,786,595 | A * | 1/1974 | Croce | 43/44.87 |
| 3,867,781 | A * | 2/1975 | Wolfe | 43/42.09 |
| 3,918,192 | A * | 11/1975 | Rabideau | 43/42.17 |
| 3,964,203 | A * | 6/1976 | Williams, Jr. | 43/42.06 |
| 3,965,606 | A * | 6/1976 | Bingler | 43/42.24 |
| 4,044,491 | A * | 8/1977 | Potter | 43/42.28 |
| 4,049,165 | A * | 9/1977 | Goldhaft | 43/18.1 R |
| 4,142,319 | A * | 3/1979 | Mihaljevic | 43/42.39 |
| 4,164,826 | A * | 8/1979 | Metzler et al. | 43/42.24 |
| 4,235,037 | A * | 11/1980 | Sivertsen | 43/44.91 |
| 4,530,180 | A * | 7/1985 | Gwaldacz et al. | 43/42.28 |
| 4,599,821 | A * | 7/1986 | Martin | 43/42.46 |
| 4,617,753 | A * | 10/1986 | Pauley et al. | 43/42.09 |
| 4,785,569 | A * | 11/1988 | Thomas, Jr. | 43/42.24 |
| 4,815,229 | A * | 3/1989 | Nicholson, III | 43/42.28 |
| 4,831,764 | A * | 5/1989 | Jecevicus | 43/42.26 |
| 4,831,770 | A * | 5/1989 | Dworski | 43/42.28 |
| 4,858,368 | A * | 8/1989 | Tolner et al. | 43/42.36 |
| 4,858,371 | A * | 8/1989 | Preiser | 43/43.16 |
| 4,864,766 | A * | 9/1989 | Bohn | 43/42.39 |
| 4,870,776 | A * | 10/1989 | Schock | 43/42.09 |
| 4,888,909 | A * | 12/1989 | Adams | 43/42.39 |
| 4,893,430 | A * | 1/1990 | Barfield | 43/42.24 |
| 4,941,280 | A * | 7/1990 | Rinaldi | 43/42.36 |
| 5,193,300 | A * | 3/1993 | Johnson | 43/43.13 |
| 5,245,782 | A * | 9/1993 | Pahle | 43/42.32 |
| 5,375,366 | A * | 12/1994 | Johnson | 43/43.13 |
| 5,386,658 | A * | 2/1995 | Ferguson | 43/44.9 |
| 5,456,040 | A * | 10/1995 | Dickens | 43/42.39 |
| 5,491,927 | A * | 2/1996 | Ortiz | 43/42.28 |
| 5,499,472 | A * | 3/1996 | Krenn | 43/43.1 |
| 5,551,185 | A * | 9/1996 | Reed | 43/42.39 |
| 5,560,142 | A * | 10/1996 | Dickens | 43/42.25 |
| 5,647,163 | A * | 7/1997 | Gorney | 43/42.28 |
| 5,709,047 | A * | 1/1998 | Link | 43/42.28 |
| 5,806,234 | A * | 9/1998 | Nichols | 43/42.39 |
| 5,822,913 | A * | 10/1998 | Lau | 43/42.26 |
| 5,887,381 | A * | 3/1999 | Stephenson | 43/44.87 |
| 5,953,849 | A * | 9/1999 | Boucher, Jr. | 43/42.24 |
| 6,073,383 | A * | 6/2000 | Line | 43/42.24 |
| 6,122,855 | A * | 9/2000 | Heuke | 43/42.09 |
| 6,199,312 | B1 * | 3/2001 | Link | 43/42.28 |
| 6,212,818 | B1 * | 4/2001 | Huddleston | 43/42.26 |
| 6,226,917 | B1 * | 5/2001 | Sylla et al. | 43/42.09 |
| 6,230,433 | B1 * | 5/2001 | Nichols | 43/42.39 |
| 6,240,672 | B1 * | 6/2001 | Huppert | 43/42.39 |
| 6,243,982 | B1 * | 6/2001 | Halterman, Jr. | 43/42.21 |
| 6,393,756 | B1 * | 5/2002 | Forney et al. | 43/42.09 |
| 6,405,477 | B1 * | 6/2002 | Huppert | 43/42.24 |
| 6,408,566 | B1 * | 6/2002 | Ward, Sr. | 43/42.26 |
| 6,665,977 | B2 * | 12/2003 | Hammond | 43/42.36 |
| 6,675,525 | B1 * | 1/2004 | Ford | 43/42.36 |
| 6,678,992 | B1 * | 1/2004 | Clark | 43/42.24 |
| 6,718,684 | B2 * | 4/2004 | Yong-Set | 43/42.39 |
| 6,745,511 | B1 * | 6/2004 | Falconer | 43/44.9 |
| 6,772,553 | B2 * | 8/2004 | Phillips et al. | 43/42.39 |
| 6,775,945 | B2 * | 8/2004 | Gibbs et al. | 43/42.28 |
| 6,836,996 | B1 * | 1/2005 | Huppert | 43/42.39 |
| 6,898,894 | B1 * | 5/2005 | Anderson | 43/42.39 |
| 7,114,285 | B1 * | 10/2006 | Ince | 43/42.28 |
| 7,124,535 | B2 * | 10/2006 | Trembone et al. | 43/17.6 |
| 7,174,670 | B2 * | 2/2007 | Lizardo et al. | 43/42.24 |
| 7,284,348 | B1 * | 10/2007 | Nugent | 43/42.24 |
| 7,415,792 | B1 * | 8/2008 | Noble | 43/44.87 |
| 7,934,339 | B2 * | 5/2011 | Richie | 43/42.33 |
| 2002/0073607 | A1 * | 6/2002 | Hickok et al. | 43/42.28 |
| 2003/0046858 | A1 * | 3/2003 | Meraw | 43/42.28 |
| 2004/0216356 | A1 * | 11/2004 | Matchinga | 43/42 |
| 2006/0075678 | A1 * | 4/2006 | Schammel et al. | 43/42.09 |
| 2006/0112608 | A1 * | 6/2006 | Snyder | 43/42.36 |
| 2006/0156612 | A1 * | 7/2006 | Brzozowski | 43/43.15 |
| 2006/0260180 | A1 * | 11/2006 | Hong | 43/42.39 |
| 2007/0044368 | A1 * | 3/2007 | Duckett | 43/42.39 |
| 2007/0107296 | A1 * | 5/2007 | Hollomon | 43/42.28 |
| 2008/0222940 | A1 * | 9/2008 | Dudley | 43/42.39 |
| 2008/0295384 | A1 * | 12/2008 | Emmott | 43/42.32 |
| 2008/0313948 | A1 * | 12/2008 | Lewis | 43/42.28 |
| 2009/0126256 | A1 * | 5/2009 | Gregory | 43/42.09 |
| 2009/0172993 | A1 * | 7/2009 | Willis et al. | 43/42.28 |
| 2009/0211144 | A1 * | 8/2009 | Murphy | 43/42.39 |

FOREIGN PATENT DOCUMENTS

| | | | |
|---|---|---|---|
| FR | 2593354 A1 * | 7/1987 | |
| FR | 2806875 A1 * | 10/2001 | |
| GB | 2258128 A * | 2/1993 | |
| GB | 2398717 A * | 9/2004 | |
| JP | 2000217471 A * | 8/2000 | |
| JP | 2000354435 A * | 12/2000 | |
| JP | 2003079277 A * | 3/2003 | |
| JP | 2003116412 A * | 4/2003 | |
| JP | 2003289760 A * | 10/2003 | |
| JP | 2003304781 A * | 10/2003 | |
| JP | 2003339276 A * | 12/2003 | |
| JP | 2004049101 A * | 2/2004 | |
| JP | 2004129566 A * | 4/2004 | |
| JP | 2005176769 A * | 7/2005 | |
| JP | 2006311825 A * | 11/2006 | |
| JP | 2007222043 A * | 9/2007 | |
| JP | 2008118898 A * | 5/2008 | |
| JP | 2008182995 A * | 8/2008 | |
| WO | WO 9957972 A1 * | 11/1999 | |

* cited by examiner

BLOOD-SIMULATING FISHING LURE

CROSS-REFERENCE TO RELATED APPLICATION

This application claims the benefit of U.S. Provisional Patent Application Ser. No. 60/996,582, filed Nov. 26, 2007 and Application Ser. No. 61/129,281, filed Jun. 16, 2008.

BACKGROUND OF THE INVENTION

1. Field of the Invention

The present invention relates to fishing lures, and more particularly to a blood-simulating fishing lure that uses a float, plug, or other artificial lure body and a ball-chain to simulate a wounded and bleeding baitfish.

2. Description of the Related Art

The use of fishing lures or other artificial devices that simulate the movement or appearance of natural or live bait is well known. Because game fish, like northern pike or walleyes, feed on insects, minnows, frogs, worms, and even small birds or mammals, it has been common to fish with live baits. Bloodworms and minnows have seen the most use, with varying degrees of success. The use of live bait does have drawbacks. Some live bait is not available in all areas or at certain times of the year. Some live bait may be expensive to purchase, and of course all live bait dies with use. Additionally, the use of certain types of bait and baitfish, such as frogs or minnows, can be restricted in certain areas, and in some areas it is illegal to fish with live bait.

Because game fish are predatory in nature, a variety of artificial lures have been developed over the years. Most commonly, these lures are designed to emulate as closely as possible the natural prey of the game fish. Many of these lures were designed to be pulled through the water, or bounced up and down in the water, to simulate the movements of injured or wounded prey, as it is presumed that injured or wounded prey appears more vulnerable and thus more attractive to the predatory game fish. In addition, spinners, propellers and other objects have been attached to lures to attract the attention of a hungry fish. Other lures have been designed to incorporate scents and aromas of various types. Scents lose potency with use, however, and many artificial lures are not natural in appearance.

Thus, a blood-simulating fishing lure solving the aforementioned problems is desired.

SUMMARY OF THE INVENTION

The blood-simulating fishing lure has an artificial lure body, for example, a float, jig, or plug, with an attached fishhook and a length of ball chain made of aluminum or other similar lightweight material. The ball chain is painted a color, such as red, to simulate blood. A hole is drilled completely through the artificial lure body, and the length of ball chain is threaded through the artificial lure body, the two ends of the chain extending at approximately equal lengths on each side of the body. The blood-simulating fishing lure is then attached to a fishing line.

In one embodiment, the buoyancy of the float may impart a natural motion to the lure, and the lightness of the metal or other lightweight material from which the chain is made allows both ends of the chain, extending on each side of the float, to move naturally in the water and give the appearance of blood flowing from a wounded and bleeding baitfish.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
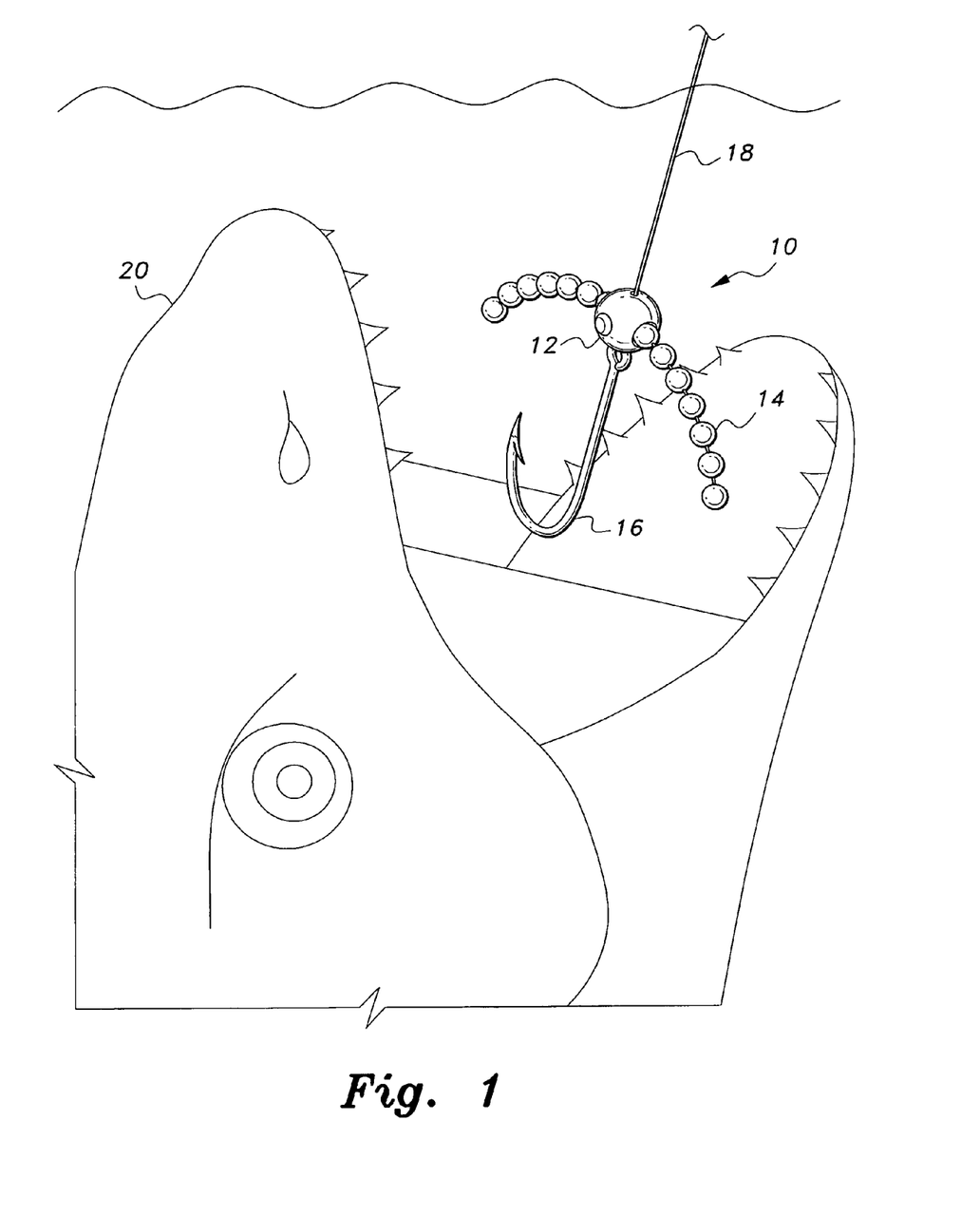
FIG. 1 is an environmental, perspective view of a blood-simulating fishing lure according to the present invention.

The present invention relates to a blood-simulating fishing lure, hereinafter designated as 10, designed to simulate a wounded and bleeding baitfish as it moves through the water. As the embodiment illustrated by FIG. 1 shows, the blood-simulating fishing lure 10 comprises a float 12, a ball chain 14 (lightweight balls connected by a flexible element, such as string, wire, monofilament, leader line, etc.), a fishhook 16 and fishing line 18. FIG. 1 shows the blood-simulating fishing lure 10 being taken by a fish 20. The balls or spherical elements of the ball chain 14 are preferably made of aluminum, plastic, or other lightweight material, and may be colored red to further simulate the appearance of blood droplets.

Figure 2:
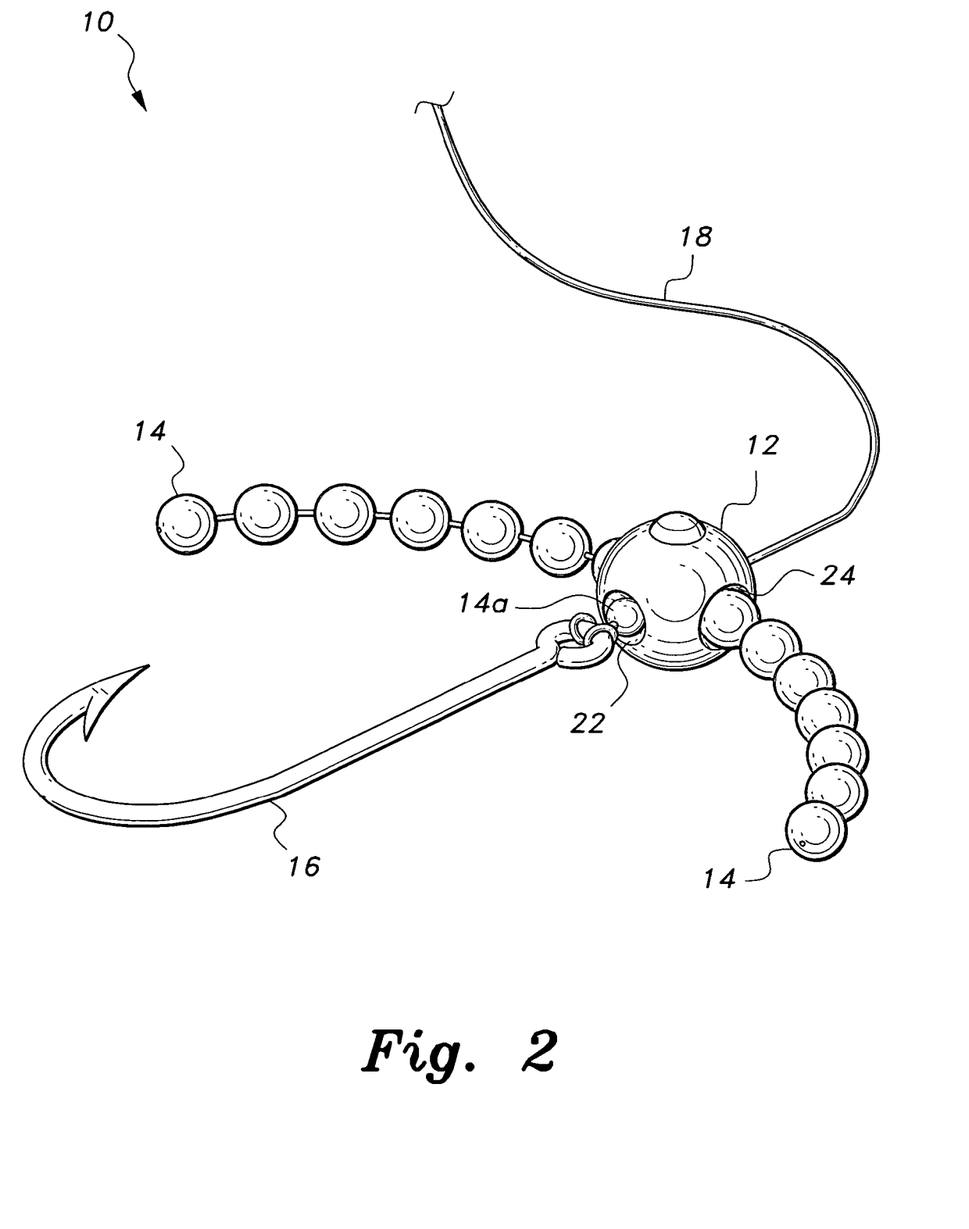
FIG. 2 is a perspective view of a blood-simulating fishing lure according to the present invention, showing the threading for the fishing line and ball chain.
Figure 3:
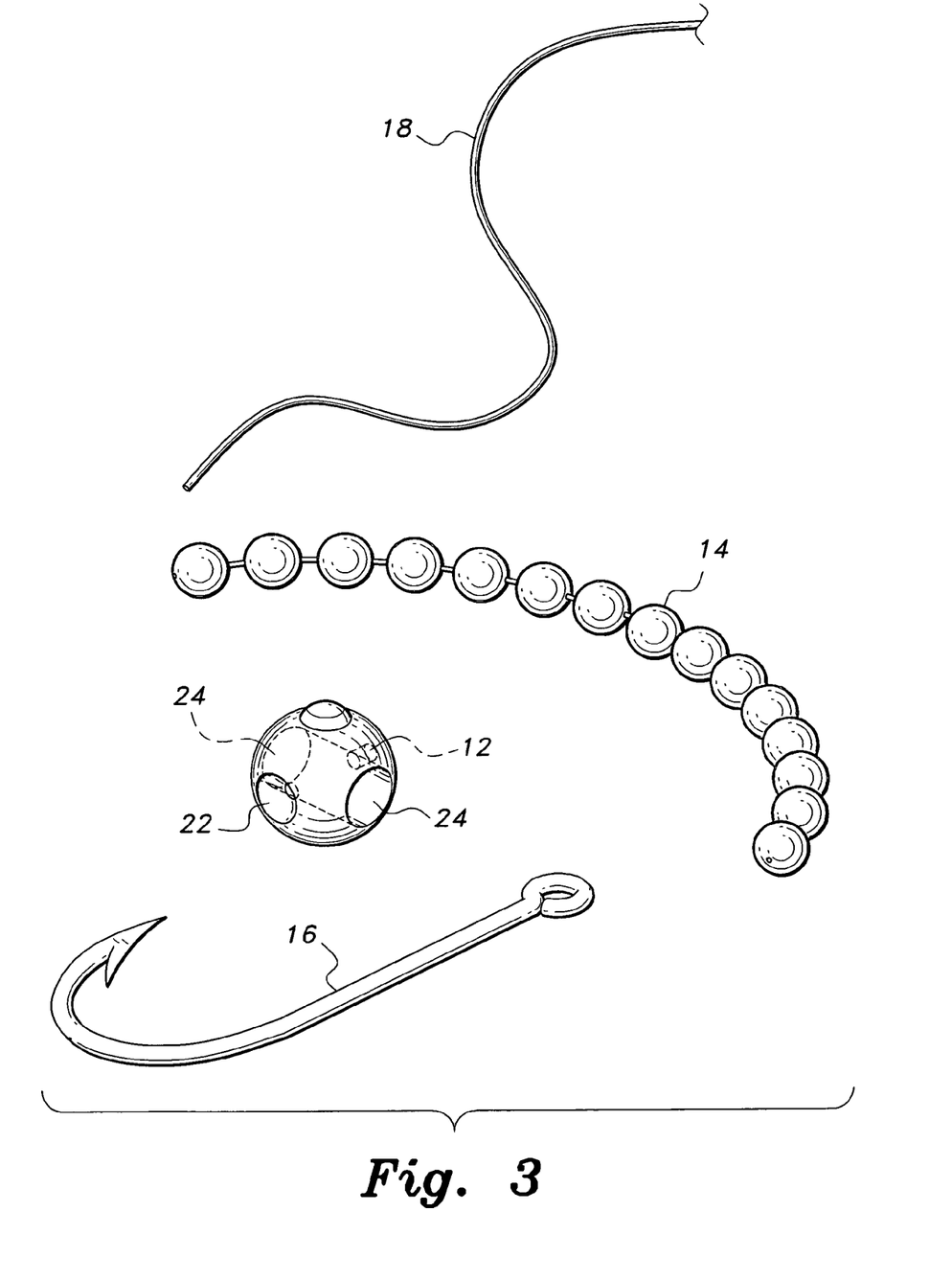
FIG. 3 is an exploded view of a blood-simulating fishing lure according to the present invention, showing the component parts of the lure.

FIG. 2 is a perspective view illustrating how the fishing line 18 attaches to the fishhook 16 through a hole 22 in the body of the float 12. The hole 22 that accommodates the fishing line 18 is drilled perpendicular to the hole 24 that accommodates the ball chain 14. A bead 14a (approximately 4 mm in diameter) is disposed adjacent the eyelet of fishhook 16 to prevent the erosion of the float 12 against the metal fishhook. FIG. 3 is an exploded view of the blood-simulating fishing lure 10 showing the relative positions of the hole 24 where the ball chain 14 is threaded, and the hole 22 where the fishing line 18 is threaded before attaching to the fishhook 16 (bead 14a not shown).

The embodiment of the fishing lure 10 illustrated by FIGS. 1-3 contemplates the use of the blood-simulating fishing lure with live bait, such as worms, minnows or frogs.

Figure 4:
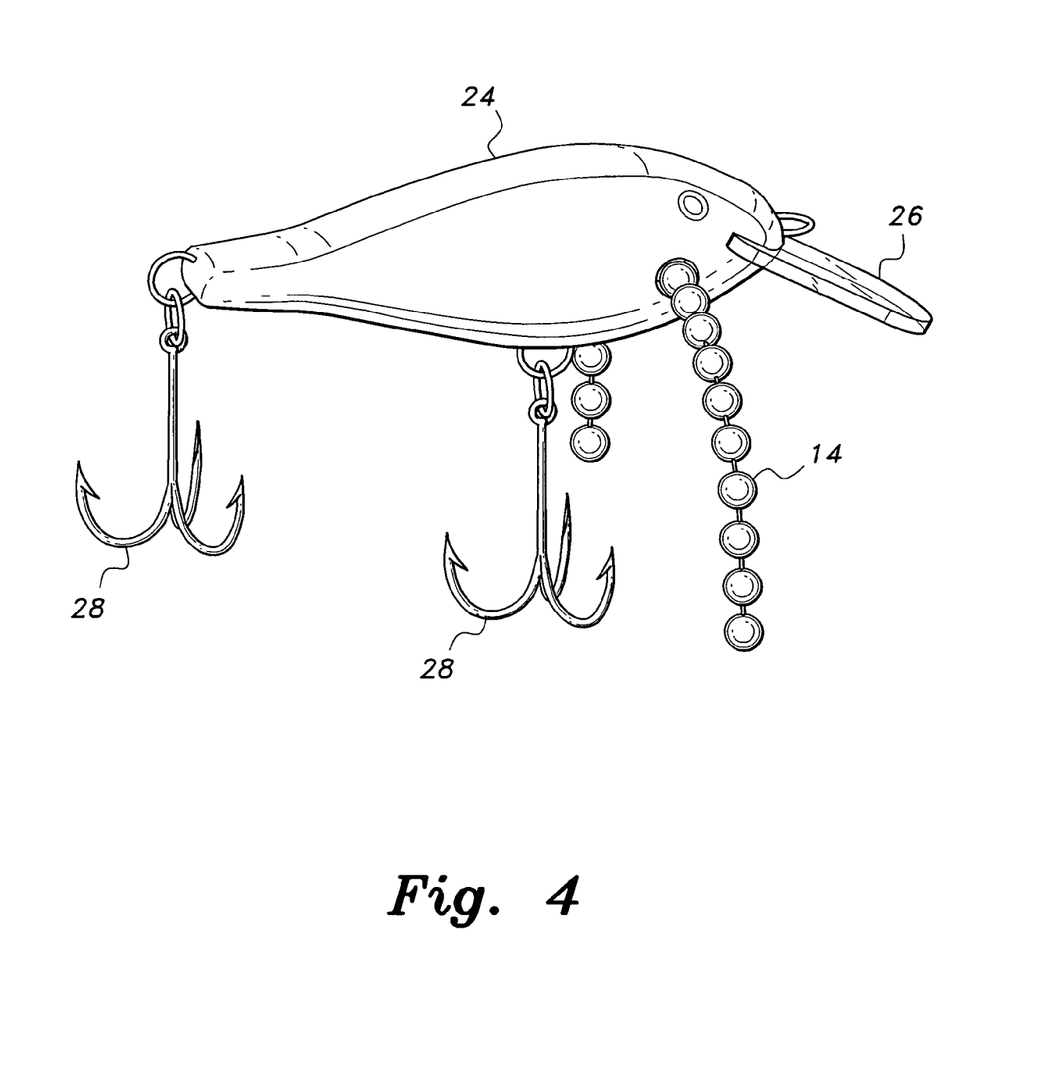
FIG. 4 is a perspective view of a second embodiment of a blood-simulating fishing lure according to the present invention, showing the ball chain threaded through a plug.

FIG. 4 shows a second embodiment of a blood-simulating fishing lure in which the aluminum ball chain 14 is threaded through a plug 24 of a type commonly referred to as a crankbait. This type of plug is characterized by two treble hooks 28 and a lip 26 that causes the plug 24 to dive as it is pulled through the water. The lure illustrated by FIG. 4 is particularly useful for catching walleye and northern pike, as anglers when fishing for walleye and northern pike commonly use the plug 24 of the type shown in FIG. 4. The blood-simulating fishing lure may be used with different sizes and configurations of plugs or other types of artificial baits, depending on the type or size of the fish to be caught.

Figure 5:
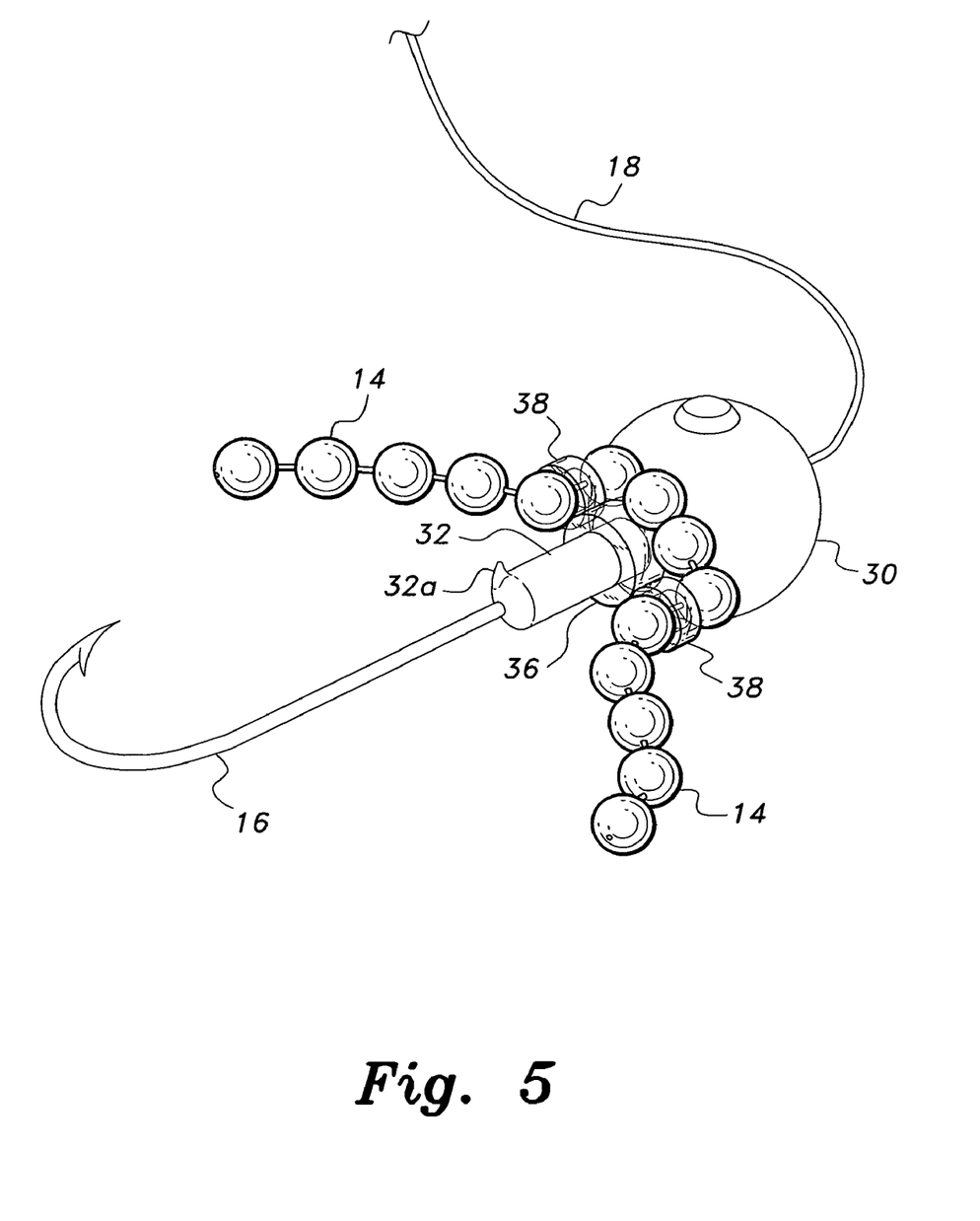
FIG. 5 is a perspective view of a third embodiment of a blood-simulating fishing lure according to the present invention, showing the ball chain threaded through two O-rings oppositely attached to a central O-ring residing on the body of an artificial lure.
Figure 6:
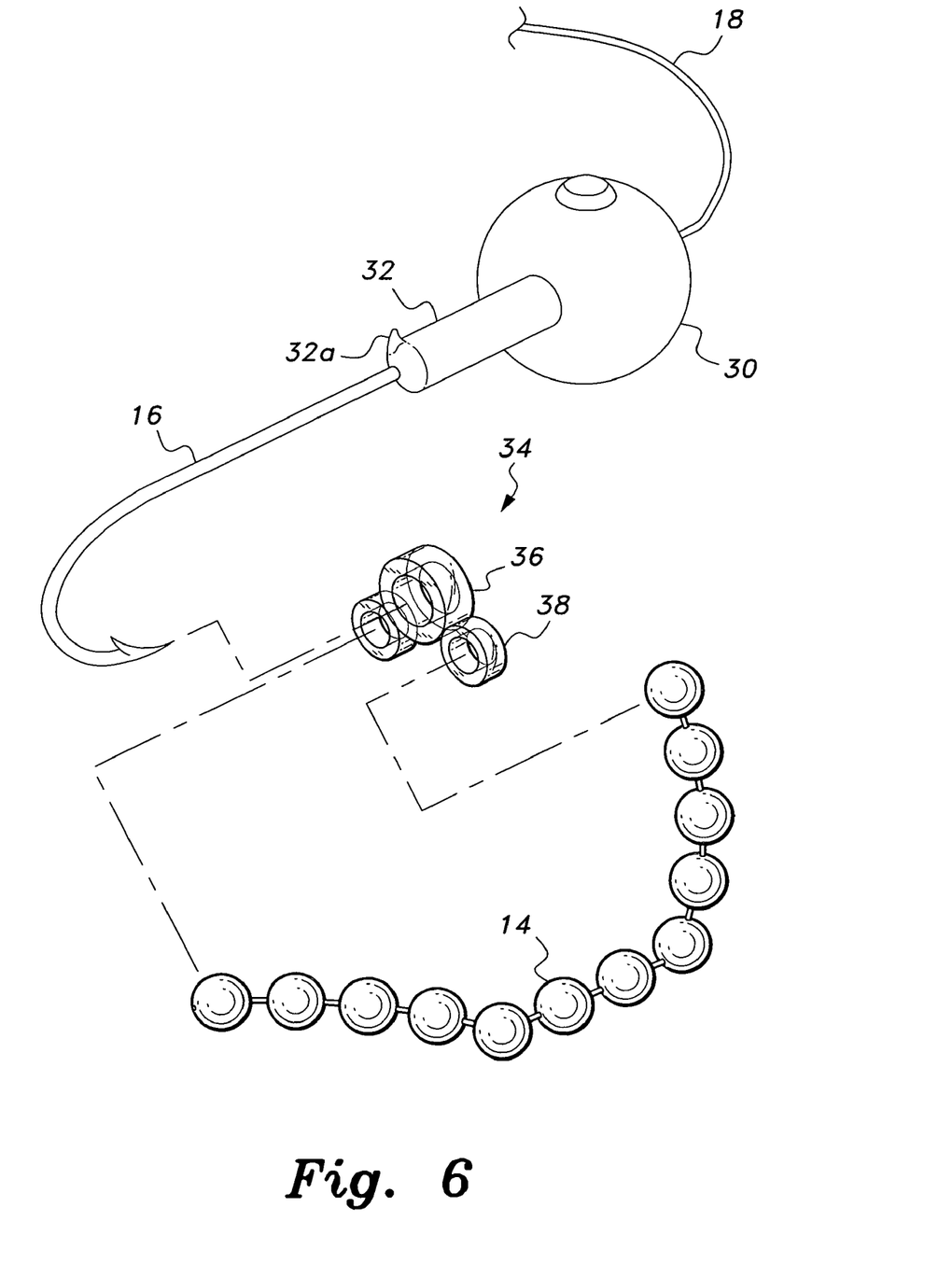
FIG. 6 is an exploded view of the blood-simulating fishing lure of FIG. 5, showing the component parts of the lure.

Although FIGS. 1-4 show the ball chain 14 extending through the body of a float or lure, the ball chain 14 may be attached to the float or lure in any convenient manner. FIGS. 5 and 6 show a jig head 30 having a shaft 32 extending therefrom. A chain mount 34 is formed from a central annular ring 36, preferably made from a resilient material, such as natural or artificial rubber. Auxiliary annular chain mounting rings 38 are joined to the outer surface of the central ring 36 by adhesive, by ultrasonic welding, by being molded in one piece, by thermal welding, or by any other technique for joining rings together. The rings 36 and 38 are arranged with the annulus of each auxiliary ring 38 parallel to the annulus of the central ring 36, and may be arranged in collinear or triangular configuration. The diameter of the central ring 36 is slightly smaller that the diameter of shaft 32, being dimensioned and configured for resiliently gripping the shaft 32 of the jig head 30. The auxiliary chain mounting rings 38 are dimensioned and configured for at least guiding opposite ends of the ball chain 14 so that the ends of the chain 14 trail away separately from the jig head 30 on generally opposite sides of the jig head 30, and may have a diameter slightly smaller than the diameter of the balls, being dimensioned and configured for resiliently gripping one of the balls of the chain 14. A barb 32a may be disposed on the shaft 32 of jig head 30 as an additional aid to prevent the ring from slipping off the shaft 32.

Although the chain mount 34 has been described as being made of resilient material, it need not be, and may be made from a material having a coefficient of friction sufficient to frictionally retain the shaft 32 and chain 14. The chain mount 34 may have only a single auxiliary ring 38, and may grip or retain the ball chain 14 by a single end of the chain 14, if desired. Finally, the ball chain 14 may be attached to the float or lure by any other convenient means, e.g., by tying the ball chain 14 to the float or lure by flexible line, etc.

Figure 7:
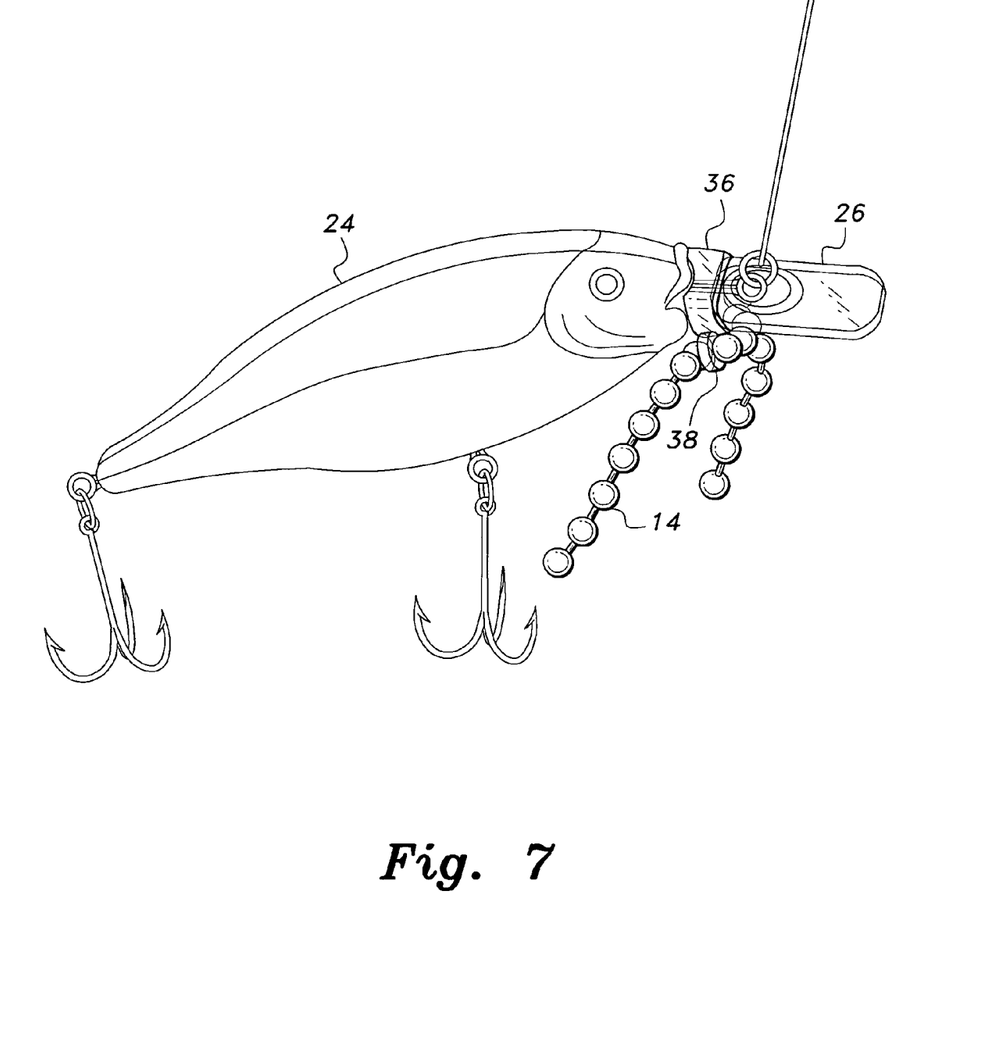
FIG. 7 is a view of a fourth embodiment of a blood-simulating fishing lure according to the present invention, showing the O-rings disposed on the lip of a plug.
Figure 8:
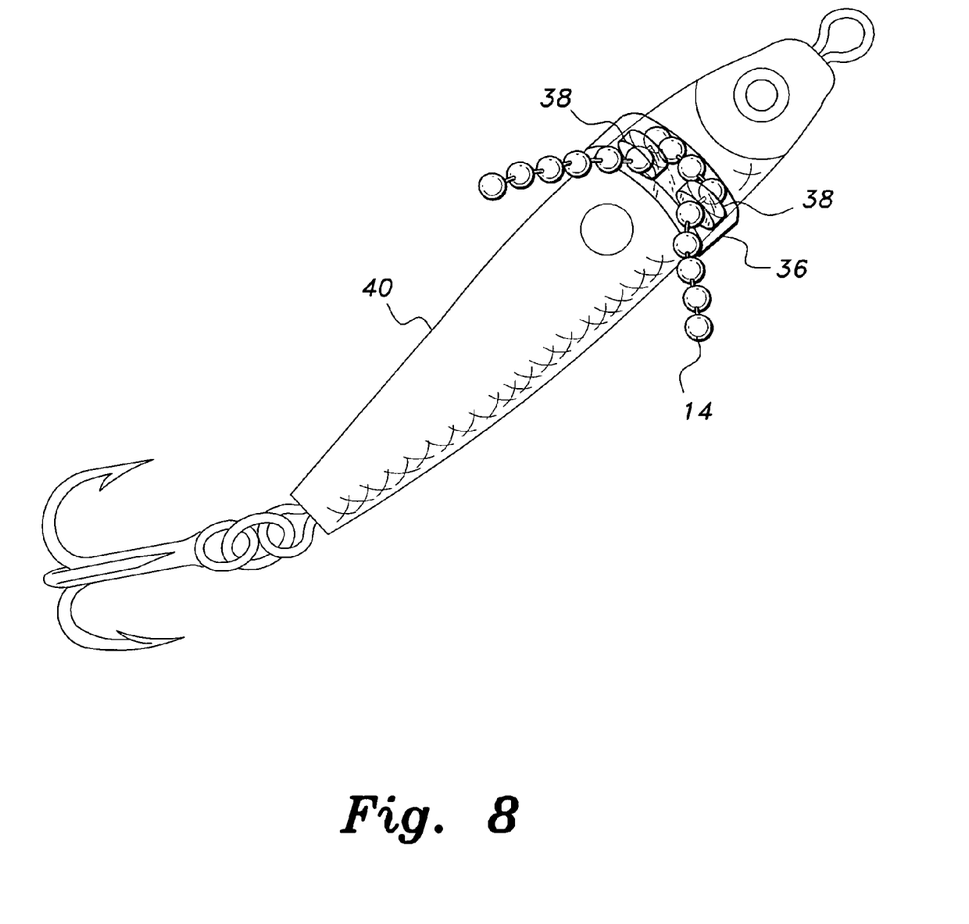
FIG. 8 is a fifth embodiment of a blood-simulating fishing lure according to the present invention, showing the O-rings disposed on a jigging spoon.
Figure 9:
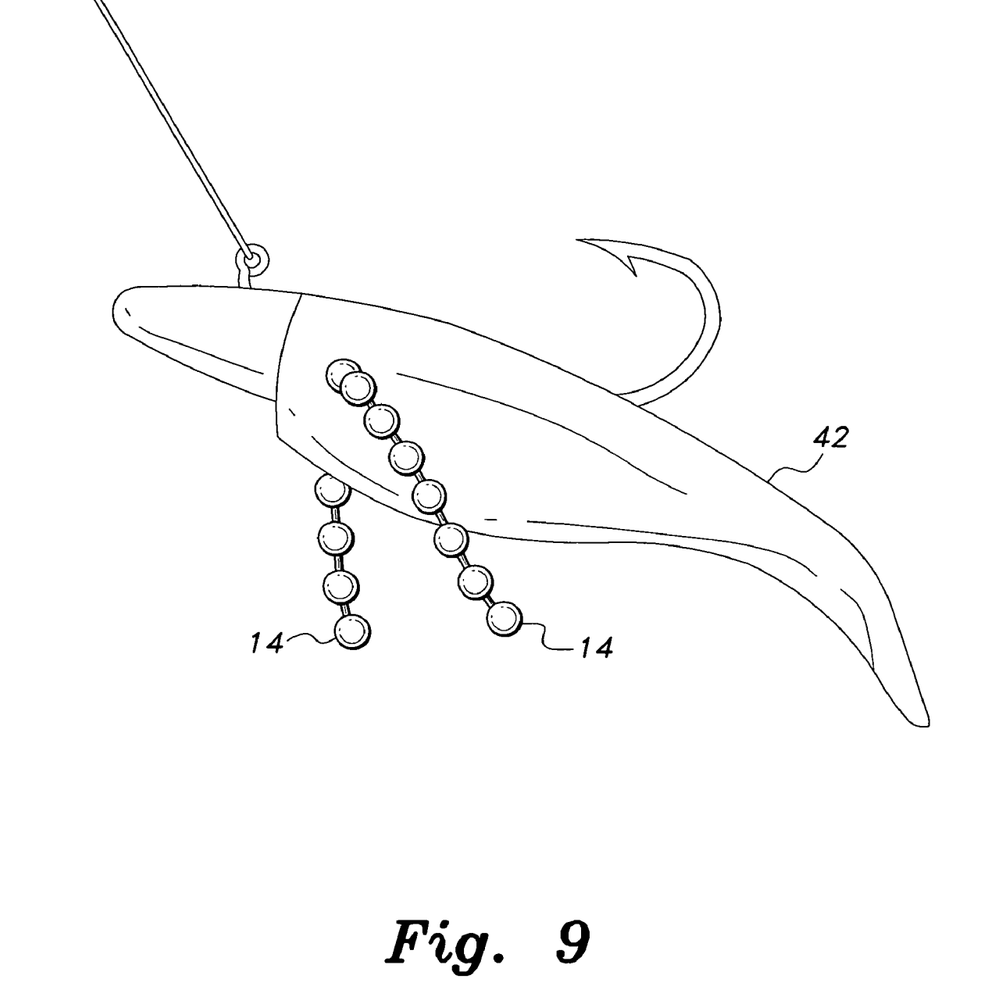
FIG. 9 is a sixth embodiment of a blood-simulating fishing lure according to the present invention, showing the ball chain threaded through a soft plastic swim bait.
Figure 10:
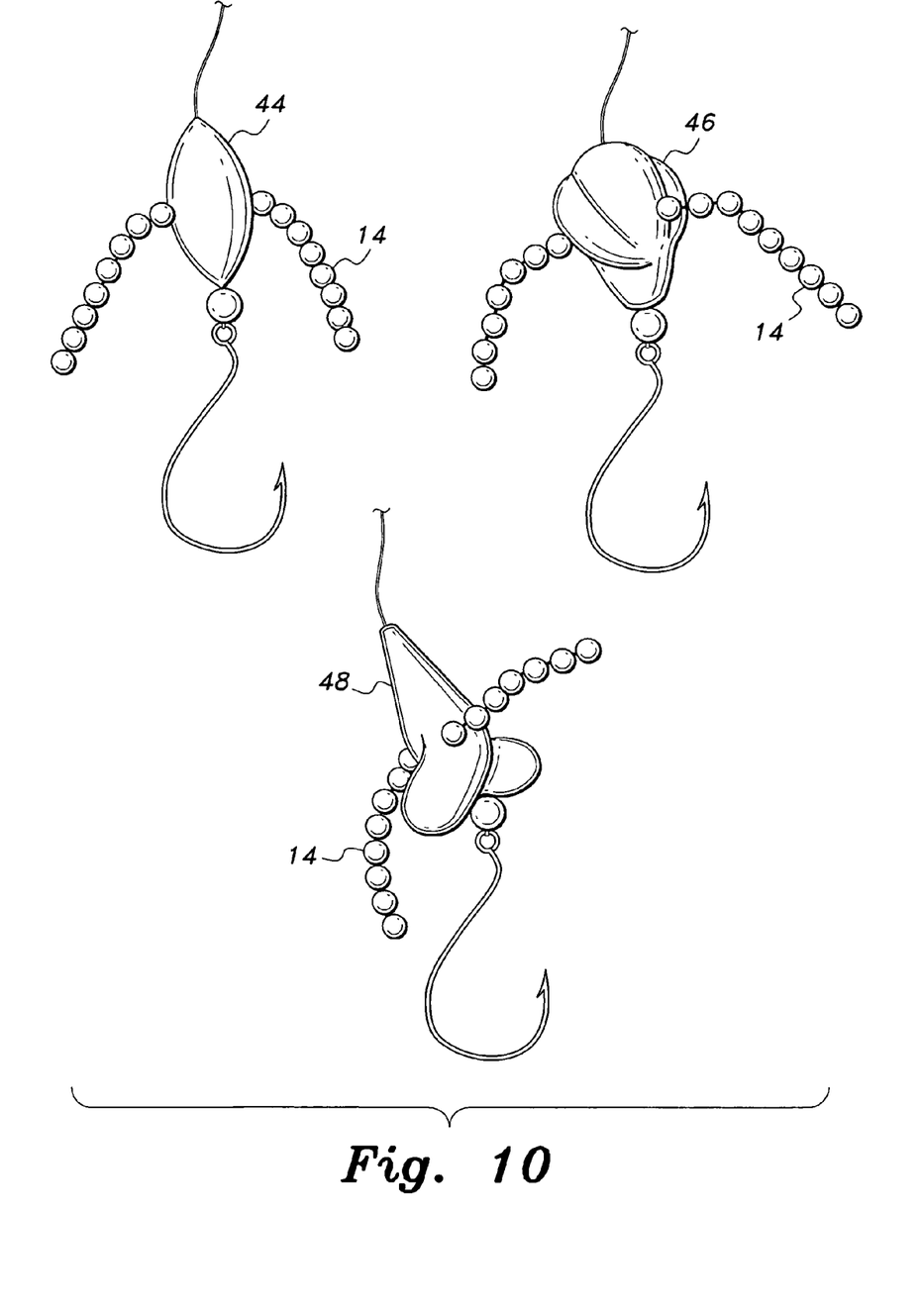
FIG. 10 disclose embodiments of a blood-simulating fishing lure according to the present invention, showing the ball chain threaded through football, prop tops and spin floats.
Figure 11:
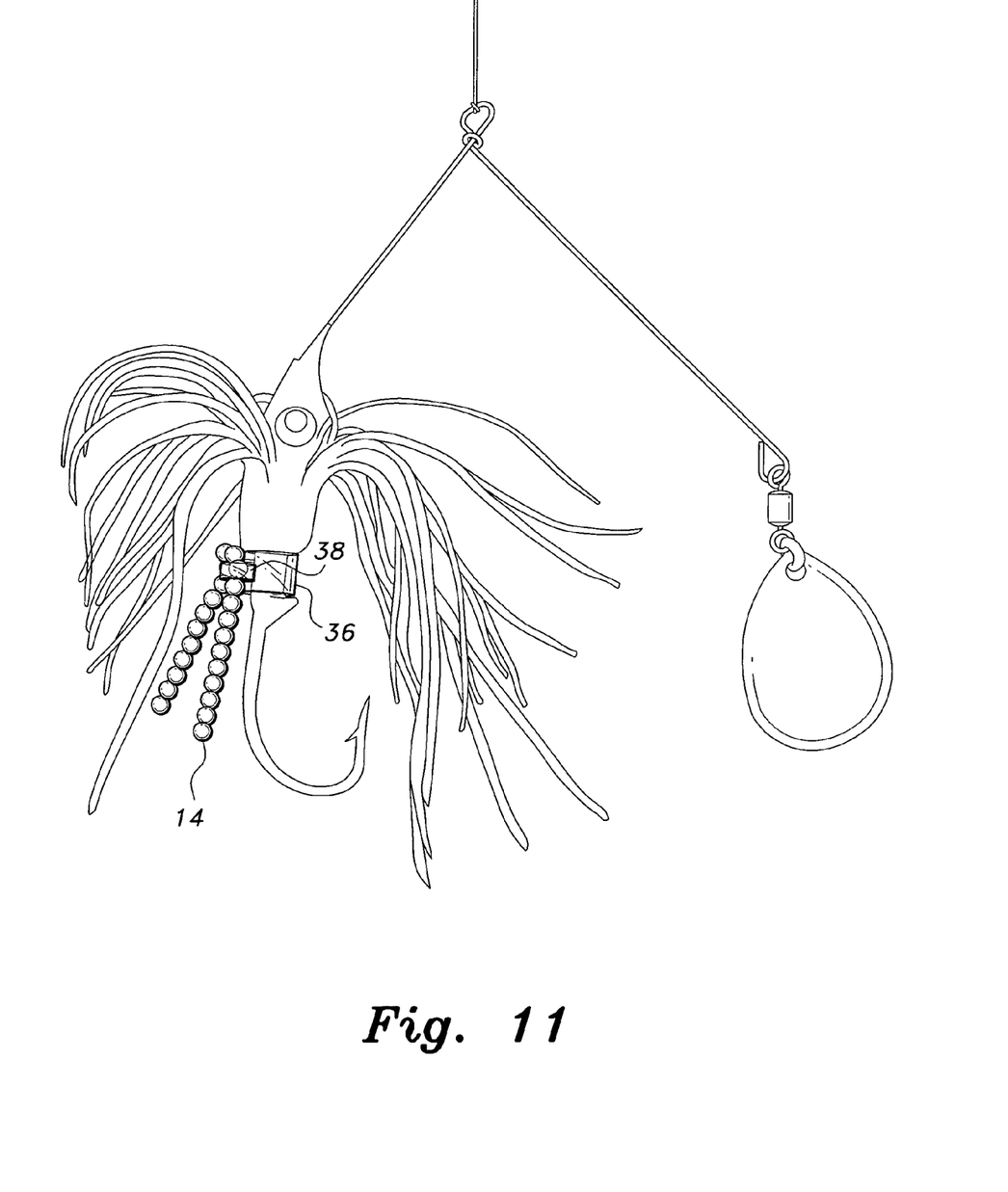
FIG. 11 discloses an embodiment of a blood-simulating fishing lure according to the present invention, showing the O-rings disposed on a spinnerbait.

In particular, as shown in FIG. 7, the chain mount 34 may be attached to a crankbait by looping the central ring 36 over the lip of the crankbait and sliding the mount 34 up to the mouth or gills of the lure. In another embodiment, shown in FIG. 8, the central ring 36 is mounted over a popular plug 40 called a jigging spoon (also known in the trade as a slab spoon that can be jigged). Instead of using the mount 34, a hole may be punctured through an artificial lure, such as a plastic minnow 42 (known in the trade as soft plastic swim baits), as shown in FIG. 9, and the ball chain may be pulled partially through the lure so that a portion of the ball chain extends from each side of the lure. FIG. 10 is illustrative of other embodiments that show the ball chain utilized with a football float 44, a spin float 46 and a prop tops float 48. FIG. 11 shows the chain mount assembly mounted on a spinnerbait. Further, the lure may be marketed as a kit by simply packaging the chain mount 34 with a ball chain so that the components that simulate the trail of blood may be attached to any desired lure using the mount. Alternatively, the ball chain may be marketed as a kit by packaging a ball chain with an implement for piercing a plastic minnow or other artificial lure, or packaged with an implement for piercing a plug, so that the ball chain may be extended through the body of any desired lure.

Although the blood-simulating fishing lure has been illustrated with certain floats and lures, it will be understood that the blood-simulating fishing lure is not limited thereto, but may comprise the ball chain in combination with any type of float or artificial lure body.

It is to be understood that the present invention is not limited to the embodiments described above, but encompasses any and all embodiments within the scope of the following claims.

I claim:

1. A blood-simulating fishing lure, comprising:
    an ornamental body configured and arranged to attract a fish;
    at least one fishhook extending from the ornamental body;
    means for attaching the ornamental body and the fishhook to a fishing line whereby the fishing line attached to the ornamental body at the attaching means defines a longitudinal plumb line extending through the apparatus when the float and fishhook are statically suspended from the attached fishing line;
    a flexible ball chain consisting of a series of at least three linearly interconnected spherical elements, each of said spherical elements both longitudinally interconnected to at least one adjacent spherical element of said spherical elements by a connecting element which extends between adjacent spherical elements and transversely deflectable relative to adjacent spherical elements, whereby the chain is effective for simulating a flow of blood droplets, the ball chain emanating from the ornamental body in a lateral direction relative to the plumb line; and
    means for attaching the ball chain to the ornamental body so that an equal number of balls are on either side of the ornamental body.

2. The blood-simulating fishing lure according to claim 1, wherein said means for attaching the ball chain includes a chain mount attaching said ball chain to said ornamental body.

3. The blood-simulating fishing lure according to claim 2, wherein said chain mount comprises a central ring and at least one auxiliary annular chain mounting ring disposed parallel to the central ring, the ball chain extending through the at least one auxiliary chain mounting ring and extending therefrom, the ornamental body further comprising a shaft extending therefrom, the central ring being mounted on the shaft.

4. The blood-simulating fishing lure according to claim 3, wherein said central ring is resilient in order to resiliently grip the shaft.

5. The blood-simulating fishing lure according to claim 3, wherein said at least one auxiliary chain mounting ring comprises a pair of auxiliary chain mounting rings, said ball chain extending through both of the auxiliary chain mounting rings.

6. The blood-simulating fishing lure according to claim 2, wherein said chain mount comprises a central ring and at least one auxiliary annular chain mounting ring disposed parallel to the central ring, the ball chain extending through the at least one auxiliary chain mounting ring and extending therefrom, the central ring being attached to the ornamental body.

7. The blood-simulating fishing lure according to claim 6, wherein said ornamental body comprises a crankbait having a lip and a mouth, the lip extending from the mouth, said central ring being disposed around the lip adjacent the mouth.

8. The blood-simulating fishing lure according to claim 1, wherein said ornamental body comprises a crankbait.

9. The blood-simulating fishing lure according to claim 1, wherein said ornamental body comprises a plastic minnow.

10. The blood-simulating fishing lure according to claim 1, wherein said ornamental body is a jigging spoon.

11. A blood-simulating fishing lure, comprising:
   a float;
   a fishhook extending from the float;
   means for attaching the float and fishhook to a fishing line whereby the fishing line attached to the float at the attaching means defines a longitudinal plumb line when the float and fishhook are statically suspended from the attached fishing line; and
   a flexible ball chain consisting of a series of at least three linearly interconnected spherical elements, each of said spherical elements both longitudinally interconnected to at least one adjacent spherical element of said spherical elements by a connecting element which extends between adjacent spherical elements and transversely deflectable relative to adjacent spherical elements, whereby the chain is effective for simulating a flow of blood droplets, the ball chain emanating from the float in a lateral direction relative to the plumb line.

* * * * *